June 4, 1968   C. J. SOENKSEN ET AL   3,386,362
FILM CARTRIDGE
Original Filed May 27, 1963
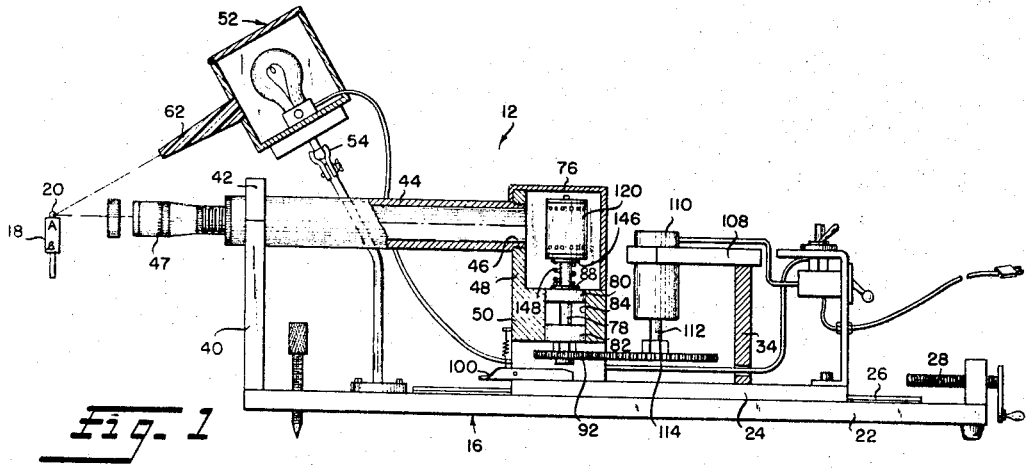
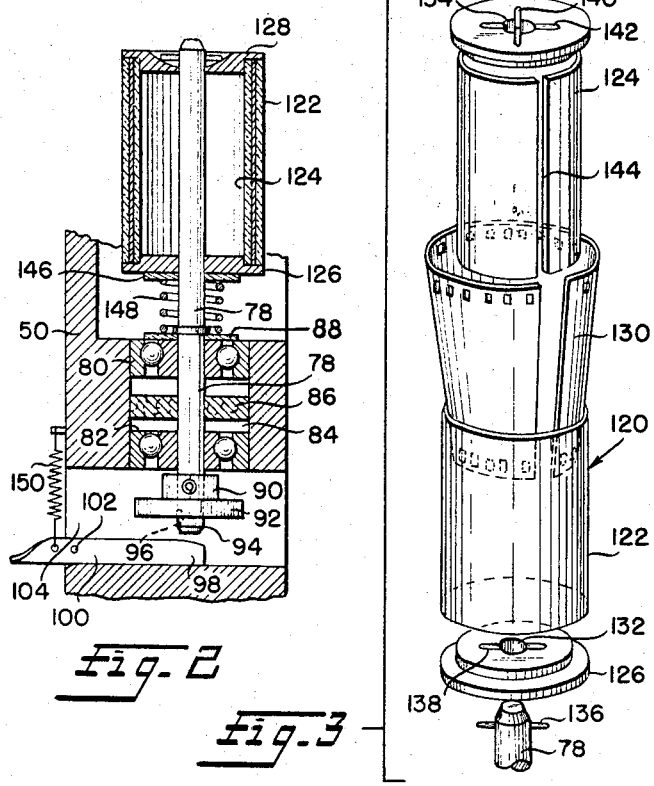
INVENTORS
Christian J. Soenksen
Joseph F. Chinlund
BY Strauch, Nolan, Neale,
Mies & Bronaugh
ATTORNEYS

United States Patent Office 3,386,362
Patented June 4, 1968

3,386,362
FILM CARTRIDGE
Christian J. Soenksen, Mundelein, and Joseph F. Chinlund, Northbrook, Ill., assignors to SCM Corporation, New York, N.Y., a corporation of New York
Original application May 27, 1963, Ser. No. 283,409, now Patent No. 3,256,525, dated June 14, 1966. Divided and this application Aug. 26, 1965, Ser. No. 482,845
8 Claims. (Cl. 95—31)

ABSTRACT OF THE DISCLOSURE

A film cartridge, for a high speed drum camera, with a transparent outer sleeve and a split internal sleeve, the normal diameter of which is larger than the internal diameter of the outer sleeve. The split internal sleeve is sprung to a smaller diameter providing a free fit insertion into the outer sleeve and also enabling disposition and pressing of a film strip between the internal and outer sleeves. Discs at the ends of the outer sleeve enable releasable coupling and removable mounting of the cartridge coaxially on a drive spindle.

---

This application is a division from copending application Ser. No. 283,409 filed May 27, 1963, now Patent No. 3,256,525, for High Speed Drum Camera (Streak Photography), and the invention herein relates to the field of photography and more particularly to a removable combination film drum and cartridge used in apparatus for accomplishing streak photography.

Although the concept of streak photography and the use of drum cameras to accomplish the same are old, practical utilization of drum cameras in the art of high speed streak photography is relatively new. Existing camera models, available today, for obtaining streak photography records perform with a high degree of speed and precision. However, these drum cameras consist of intricate mechanisms and are highly developed and complex instruments. They are also rather large and cumbersome.

Many cameras used in streak photography operate on the rotating prism principle and many others operate with a film drum; however, the drums are constructed on a much larger scale than the present invention. With the present film cartridge invention for a drum camera, however, the film drum is very small, it is easy to load and is so inexpensive to manufacture that many drums can be made up as pre-loaded cartridges, stored close at hand for instant use.

The use of the camera apparatus as described fully in said application enables concentrating a beamed light into the camera with such pinpoint intensity that a very sharply defined streak is recorded on the film. The resulting record can be readily analyzed directly from a short strip of film of 35 mm. size.

The dimensions of most known drum cameras make them impractical for the smaller projects and their extreme high cost puts them far beyond the financial scope of the average research laboratory. Conversely, the simplicity of components, including the film cartridge and drum of this invention, and ease in operation of the camera apparatus of the invention in said copending application result in a very low over-all cost and, coupled with small size and portability, make the camera apparatus and the film cartridge extremely practical for laboratory or research use.

Accordingly, a primary object of this invention resides in the provision of a novel low cost, compact film cartridge and drum.

Another object resides in the provision of a novel film strip drum cartridge for use in a high speed drum camera, the film cartridge including a small diameter cylindrical sleeve made from transparent material with removable means inside the sleeve to press a strip of film against the inside cylindrical surface and end units on both ends of the sleeve to provide for mounting of the sleeve coaxially on, and drive connection of the sleeve, to a camera drive spindle.

Further novel features and other objects of this invention will become apparent from the following description, discussion and the claims taken in conjunction with the drawings showing a preferred structure and embodiment, in which:

FIGURE 1 is a side elevation, partially sectioned, of the streak photography apparatus and illustrates the relationship between the drum camera assembly including the film cartridge drum, the light source and the object being photographed.

FIGURE 2 is an enlarged detail section view of the film drum, assembled and mounted on the drum shaft, and also illustrates the shaft locking device; and FIGURE 3 is an exploded view of the film drum components and the drum shaft, the drum components being illustrated in the order of their assembly.

Referring now to the drawings, in which like numerals are used throughout to designate like parts in the several views, and more particularly to FIGURE 1, the streak photography apparatus includes a camera assembly 12 and light box 52 with a base, or support structure 16 as it may be used to record and measure vibrations resulting when a high speed printer type pallet 18 undergoes an impact print action, by means of reflected light from a polished sphere 20 mounted on the type pallet.

An upright front plate 40 is fixed to the forward end of a base plate 22 and, together with a guide block 42, provides a cylindrical guide and support bracket for permitting reciprocal movement of the camera lens tube 44 whenever the camera is shifted on tracks 26. The rear end of the lens tube 44 projects into and is secured as by screw threads in an opening 46 in the front wall 48 of camera body 50 which in turn is securely fastened to the subassembly base plate 24. Threadedly fastened on the front end of the lens tube 44 is a conventional 8 mm. lens system 47. Manipulation of an adjusting screw 28 will shift the complete camera assembly either forward or backward and the barrel shaped lens tube 44 will thus be concurrently shifted in the same direction along its guide bracket 40, 42, enabling focusing of the camera relative to a unit being photographed. Additional focusing could be accomplished, if desired, by auxiliary adjustment of the lens system 47.

A light source is used in conjunction with the camera and is incorporated in light box 52 which can be conveniently mounted on a swivel support 54 secured to the main base plate 22, as shown, or the light box can be mounted by other means, e.g., on a conventional independent tripod support or on a clamp bracket, both of which devices are well-known and commercially available light source support arrangements. The long tapered rod 62 is used where the pohtographed part is somewhat obscured or hidden and the light beam must be accurately directed into the interior of a machine to attain maximum reflection.

Returning to the camera assembly in FIGURES 1 and and 2, the camera body 50 is a light-proof, box-like housing with a hinged top wall 76 serving as a closure and access cover to the interior of the housing 50. Shown in detail in FIGURE 2, an upright drum spindle 78 is journalled by two bearings 80 and 82, press fit into an opening 84 in the bottom wall of camera housing 50. A felt washer 86 may be placed on spindle 78 between the two bearings and will suffice to light-proof the bearings and their retaining opening 84. The axis of spindle 78 is arranged to vertically intersect the axis of the lens tube 44 with the upper portion of the spindle disposed behind the lens tube opening 46 and within the camera body 50. Spindle 78 is axially maintained in its bearings 80 and 82 by means of a split ring clip 88 and the hub 90 of a small spur gear 92 non-rotatably secured by a set screw on the lower end 94 of the spindle. The lower spindle end 94 is slotted at 96 thereby enabling engagement by the blade end 98 of a spring loaded finger operated latching lever 100 which is pivoted on a horizontal post 102 fixed in the base wall 104 of camera housing 50. The latch device 100 aids in assembly of the drum on the spindle as will be hereinafter more fully described.

The upright wall member 34 and a cooperating horizontal wall member 108, fixed to the camera sub-assembly base plate 24, provide a bracket mounting for an electric motor 110. The motor has a downwardly projecting motor shaft 112 to which is secured a large spur gear 114 meshed with gear 92. The large gear 114 has 3 times as many teeth as does gear 92 and thereby will provide spindle 78 with a 3:1 step-up ratio from the rotational speed of motor drive shaft 112. Spindle 78 drives a film drum 120 to be now described and its rotational speed determines the time base constant for the record to be made on the film.

Referring to FIGURES 2 and 3, the film drum 120 consists of four simple parts, an outer sleeve 122, an inner split sleeve 124, and two end discs 126 and 128 both of which, for convenience in manufacture, can be made identical although they each provide distinct structural cooperations in the final assembly.

The outer sleeve 122 and preferably, although not necessarily the inner sleeve 124 are made of a transparent material such as the aforedescribed "Lucite." Both end discs 126 and 128 can be made from similar plastic material or from a light weight metal. In any case the discs should be coated with a flat black paint or similar substance to eliminate undesirable light rays.

Holes 132 and 134 are centrally drilled in the respective end discs 126 and 128 so that they will slip over the drum shaft 78. A transverse, bayonet type lock pin 136 is fixed in the upper end of the drum shaft and, to permit discs 126 and 128 to slip onto the drum shaft, cross slots 138 and 140 are cut across the holes 132 and 134 completely through the respective discs 126 and 128. One disc will, but each disc can also include a second blind bottom slot transverse to the through slots, one such blind slot 142 being shown in the upper disc 128 in FIGURE 3.

A short strip of 35 mm. film 130 is the loading for drum 120, being rolled into a cylindrical shape, emulsion side out, and inserted into the outer sleeve 122. The inner split sleeve 124 is inserted into the outer sleeve by slightly squeezing the inner sleeve, closing the gap 144 where the sleeve is split to make its outside diameter small enough to fit inside of the outer sleeve and film strip. When released, the inner sleeve 124 will attempt to spring back to its original diameter and effectively compresses the film strip 130 between the outer sleeve 122 and the inner sleeve 124. A lower end disc 126 and an upper end disc 128 are then placed at and spigoted into respective ends of the assembled outer and inner sleeves 32 to complete the film drum assembly 120.

An assembled film drum 120 is placed on the drum shaft 78 with the lower end disc abutting a washer 146 which overlaps a small compression spring 148 which rests on a second washer. While placing the drum assembly on and locking it to the bayonet locking pin 136, the drum shaft locking lever 100 is held depressed, causing its end 98 to move upward into the slot 96 in the lower end of the drum shaft 78, thus preventing inadvertent rotational movement of the shaft. The complete film drum assembly 120 is forced downward against the force of the compression spring 148 until the spindle end and locking pin 136 projects through the slot 140 of upper disc 128 and clears the top surface of that disc. Then the film drum assembly 120 is rotated 90° in either direction until the blind slot 142 is aligned with the locking pin. The film drum assembly 120 is then released and compression spring 148 forces it upward so the blind slot 142 fits over the locking pin 136, effectively securing the film drum 120 for rotation with the drum shaft 78. Spring 148 also helps maintain the drum components in assembly. Drum shaft locking lever 100 can then be released and its return spring 150 will return it to normal position which is unlatched from the drum shaft 78. The camera housing lid 76 is closed after the drum assembly 120 is inserted.

The invention may be embodied in other specific forms without departing from the spirit or essential characteristics thereof. The present embodiment is therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. For use in combination in a high speed drum camera, a film strip drum cartridge comprising: a sleeve made of transparent material and having an internal surface of cylindrical configuration, removable means having a cylindrical configuration and extending substantially coextensive with a photographic film strip for uniformly and securely pressing the film strip against said internal surface of said sleeve, and means on both ends of said sleeve for enabling quick coaxial mounting and connection of said sleeve to a drive spindle.

2. A combination cartridge and drum for a high speed rotating drum camera for operatively maintaining a preloaded film strip in cylindrical disposition with the emulsion side of the film strip available to record light directed toward the drum axis from exterior of the drum, while rotating the drum and film strip at high speed comprising: an outer sleeve made from transparent material and having an internal cylindrical surface; an internal split sleeve normally having a diameter larger than the internal cylindrical surface diameter of said outer sleeve and having a split enabling the inner sleeve to be sprung to a smalled diameter providing for its free fit insertion into said outer sleeve and also enabling disposition of a strip of film between said inner and outer sleeves; and end discs disposed over the ends of said sleeves, at least one of which discs has a releasable drive coupling means enabling a quick release coupling of said one end disc to a drive spindle of the camera.

3. A combination cartridge and drum as defined in claim 2, wherein said end discs have spigot portions fitting within the ends of said internal sleeve and radially directed flange portions overlying the ends of both sleeves, both of said end discs having means to coaxially mount said sleeves on a spindle.

4. A combination cartridge and drum as defined in claim 2, wherein said split internal sleeve extends substantially the entire length of said outer sleeve.

5. A combination cartridge and drum as defined in claim 2, further comprising a spindle and said coupling means includes a spring means for conjointly clamping said end discs against the ends of said outer sleeve and urging said drum to its coupled condition with said spindle.

6. For use in combination in a high speed drum camera, a photographic film strip drum cartridge comprising: a sleeve made of transparent material and having an internal surface of cylindrical configuration, means removable from within said sleeve by shifting movement relative to said sleeve for securely pressing substantially the entire surface area of a strip of photographic film against said internal surface, a spindle, means at each end of said sleeve for mounting said sleeve coaxially about said spindle, and means providing for rapid connection and disconnection between said spindle and at least one of said mounting means to provide for ready removal of said pressing means and the film strip from within said sleeve.

7. For use in combination in a high speed drum camera, a film strip drum cartridge comprising: an outer sleeve made of transparent material and having an internal cylindrical surface, a spindle, means for mounting said outer sleeve coaxially about said spindle, a removable internal split sleeve extending substantially coextensive with a film strip disposed between said internal and outer sleeves for pressing substantially the entire surface area of the film strip against said internal surface, said internal split sleeve normally having a diameter larger than the internal cylindrical surface diameter of said outer sleeve and having a split enabling the internal sleeve to be sprung to a smaller diameter providing for its free fit insertion into said outer sleeve and also enabling disposition of the film strip between said internal and outer sleeves.

8. A film strip drum cartridge as defined in claim 7, including means comprising said mounting means and said spindle for clamping said mounting means against the ends of said outer sleeve.

References Cited
UNITED STATES PATENTS

| | | | |
|---|---|---|---|
| 2,539,009 | 1/1951 | Chaney et al. | 346—138 |
| 2,646,335 | 7/1953 | Wise et al. | 346—138 |

NORTON ANSHER, *Primary Examiner.*

J. F. PETERS, *Assistant Examiner.*